(12) United States Patent
Rowitch

(10) Patent No.: US 6,788,663 B2
(45) Date of Patent: Sep. 7, 2004

(54) SYSTEM, METHOD, AND APPARATUS FOR GENERATING A TIMING SIGNAL

(75) Inventor: Douglas Neal Rowitch, Del Mar, CA (US)

(73) Assignee: QUALCOMM Inc, San Diego, CA (US)

( * ) Notice: Subject to any disclaimer, the term of this patent is extended or adjusted under 35 U.S.C. 154(b) by 202 days.

(21) Appl. No.: 10/138,704

(22) Filed: May 3, 2002

(65) Prior Publication Data

US 2003/0207681 A1 Nov. 6, 2003

(51) Int. Cl.[7] .............................................. H04B 7/216
(52) U.S. Cl. ...................... 370/335; 370/342; 455/12.1
(58) Field of Search .................................. 370/332, 342, 370/343, 350; 455/502, 456.1–456.6, 13.2, 12.1, 18

(56) References Cited

U.S. PATENT DOCUMENTS

| | | | |
|---|---|---|---|
| 5,646,630 A | | 7/1997 | Sheynblat et al. ........... 342/357 |
| 6,185,429 B1 | | 2/2001 | Gehrke et al. ............... 455/502 |
| 6,346,911 B1 | * | 2/2002 | King ....................... 342/357.06 |
| 6,377,792 B1 | * | 4/2002 | Brown et al. ................. 455/411 |
| 6,429,808 B1 | * | 8/2002 | King et al. ............. 342/357.02 |
| 2002/0167918 A1 | * | 11/2002 | Brewer ........................ 370/324 |

FOREIGN PATENT DOCUMENTS

| | | | |
|---|---|---|---|
| EP | 0588598 | 9/1993 | ............. G01S/5/14 |
| EP | 0822674 | 2/1998 | ............ H04B/7/26 |
| EP | 0924878 | 6/1999 | ............ H04B/7/26 |
| WO | 0064091 | 10/2000 | ............ H04L/7/00 |

* cited by examiner

Primary Examiner—Chi Pham
Assistant Examiner—Thai D Hoang
(74) Attorney, Agent, or Firm—Philip Wadsworth; Charles Brown; Donald Kordich (57) ABSTRACT

A method of wireless communications according to one embodiment of the invention includes obtaining a first time base (e.g. obtaining a code phase) from a signal received from a ground transmitter (e.g. a CDMA base station). A predetermined offset based on at least a propagation delay of the received signal is applied to the first time base to obtain a second time base. For example, the second time base may be aligned to a time base of a positioning satellite system (e.g. the NAVSTAR GPS). A timing signal is generated that has a code phase based on the second time base.

6 Claims, 12 Drawing Sheets

SYSTEM, METHOD, AND APPARATUS FOR GENERATING A TIMING SIGNAL

BACKGROUND

1. Field of the Invention

This invention relates to wireless communications.

2. Description of Related Art

Position determination has become significantly easier and more accurate since the development of positioning satellite systems. One example of a system of positioning satellites is the NAVSTAR Global Positioning System (GPS) (as described in Global Positioning System Standard Positioning Service Signal Specification, $2^{nd}$ edition, Jun. 2, 1995, United States Coast Guard Navigation Center, Alexandria, Va.). Another example of an existing system is the GLONASS GPS maintained by the Russian Republic. Positioning satellite systems under planning include the European GALILEO proposal. GPS receivers are currently available for use in aircraft, ships, and ground vehicles and for hand carrying by individuals.

The NAVSTAR GPS provides for thirty-two satellites or 'space vehicles' (SVs) (twenty-four are currently active) that orbit the earth in six orbital planes (four satellites in each plane). The SV orbits repeat almost the same ground track as the earth turns beneath them each day. The orbital planes are equally spaced and inclined with respect to the equatorial plane, thus ensuring that a line-of-sight path exists to at least five SVs from any (unobstructed) point on the earth.

Each SV carries a highly accurate atomic clock that is synchronized to a common time base. Ground-based monitor stations measure signals from the SVs and incorporate these measurements into orbital models for each satellite. Navigation data and SV clock corrections are computed for each satellite from these models and are uploaded to each SV. The SV then transmits a navigation message that includes information relating to its position.

Each SV transmits its navigation message at a data rate of 50 bits per second via a direct sequence spread spectrum signal (DSSS) that is BPSK (binary phase-shift-keying) modulated onto a 1.57542-GHz carrier (also called L1 frequency). To spread the signal, each SV uses a different one of thirty-two pseudo-random noise (PRN) sequences (also called coarse acquisition or C/A codes) that have a chip rate of 1.023 MHz and a length of 1023 chips. The spreading codes are aligned with the common time base and repeat every millisecond.

A GPS receiver calculates its position by combining data from the navigation message (which data indicates the position of the SV) with the delay of the signal received from the SV (which indicates the position of the receiver relative to the SV). Because of offsets in the receiver's time base relative to the GPS time base, signals from at least four SVs are typically required to resolve a position in three dimensions, although signals from additional SVs (if available) may be used to provide better accuracy.

Problems in GPS signal detection may occur when a GPS receiver cannot receive a line-of-sight signal from a sufficient number of SVs. In obstructed environments (e.g. indoors or underground), therefore, it may be difficult or impossible for a GPS receiver to make an accurate position determination.

A pseudolite is a terrestrial transmitter that receives one or more GPS signals and generates and transmits a C/A waveform at the GPS L1 carrier frequency. In the NAVSTAR GPS system, PRN sequences 33 through 37 are not assigned to satellites and may be used by a pseudolite to generate and transmit the C/A waveform. If the timing and position of a pseudolite are known with high precision, then the transmitted C/A waveform may be used to make a position determination.

Pseudolites may be used to augment GPS coverage. Unfortunately, pseudolites require a line-of-sight signal from one or more GPS satellites and are useful only where a GPS signal is available.

SUMMARY

A method of wireless communications according to one embodiment of the invention includes obtaining a first time base from a signal received from a ground transmitter. For example, obtaining the first time base may include obtaining a code phase of the received signal and/or decoding a time information message from the received signal. Obtaining the first time base may also include synchronizing an oscillator or adjusting a counter or code generator. In one example, the first time base is obtained from a signal received from a base station of a network for cellular telephony (e.g. a CDMA base station).

Such a method also includes applying a predetermined offset to the first time base to obtain a second time base. The predetermined offset is based on a propagation delay of the received signal. The predetermined offset may also be based on signal processing delays and/or other signal transmission delays. Obtaining the second time base may include synchronizing an oscillator or adjusting a counter or code generator.

Such a method also includes generating a timing signal that has a code phase based on the second time base. For example, the code phase of the timing signal may be aligned to a time base of a positioning satellite system (e.g. the NAVSTAR GPS).

DETAILED DESCRIPTION

Figure 1:
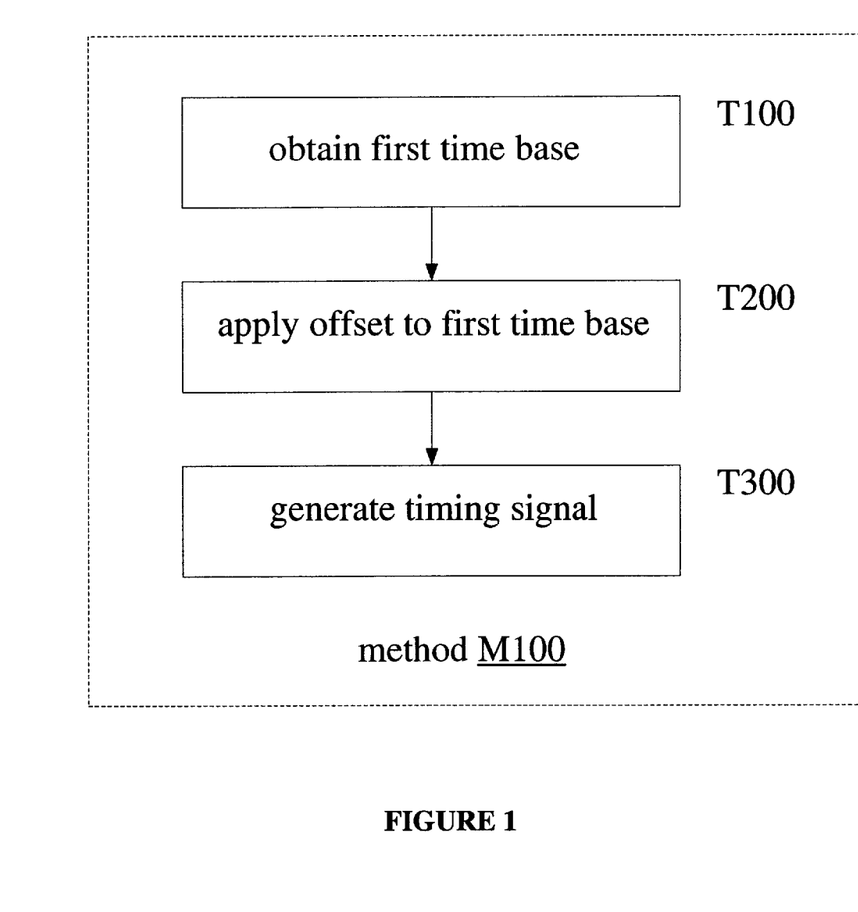
FIG. 1 shows a flowchart of a method M100 according to an embodiment of the invention.

FIG. 1 shows a flowchart for a method M100 according to an embodiment of the invention. Task T100 obtains a first time base from a signal received from a ground transmitter ('the received signal'). Task T200 applies a predetermined offset to the first time base to obtain a second time base. The predetermined offset is based on a propagation delay of the received signal. Task T300 generates a timing signal whose code phase is based on the second time base.

The received signal may be modulated according to an amplitude modulation (AM) scheme such as OOK (on-off keying); a frequency shift keying (FSK) scheme; a phase shift keying (PSK) scheme such as BPSK (binary PSK), QPSK (quadrature PSK), 8-PSK, or OQPSK (offset QPSK); a minimum shift keying (MSK) scheme such as GMSK (Gaussian MSK); or a mixed scheme such as QAM (quadrature amplitude modulation). In certain applications, task T100 obtains the first time base from a terrestrial source that maintains (or that has better access to) a more accurate time base than is available at the point of reception.

In an exemplary application of method M100, task T100 obtains the first time base from a signal received from a base station of a network for wireless communications. For example, the network may be a network for cellular telephony such as an AMPS (Advanced Mobile Phone System) network, a GSM (Global System for Mobile Communications) network, or a network compliant with one or more CDMA (code-division multiple access) standards such as Telecommunications Industry Association/ Electronics Industries Association Interim Standard-95 (TIA/EIA IS-95), "MOBILE STATION-BASE STATION COMPATIBILITY STANDARD FOR DUAL-MODE WIDEBAND SPREAD SPECTRUM CELLULAR SYSTEM," published in July 1993, TIA/EIA/IS-835-A, "CDMA2000 WIRELESS IP NETWORK STANDARD," published in May 2001; TIA/EIA/IS-856, "CDMA2000, HIGH RATE PACKET DATA AIR INTERFACE SPECIFICATION," published in November 2000; TIA/EIA/ IS-2000.1-A, "INTRODUCTION TO CDMA2000 STANDARD FOR SPREAD SPECTRUM SYSTEMS," published in March 2000, and the other five documents of the IS-2000 series; and TIA/EIA/IS-707-A, "DATA SERVICE OPTIONS FOR WIDEBAND SPREAD SPECTRUM SYSTEMS," published in April 1999.

A network for wireless communications may include one or more repeaters, where each repeater receives and retransmits a signal transmitted by a base station. Such devices may be used to provide signal availability in obstructed areas, such as urban canyons or subway tunnels. Alternatively, repeaters may be used to extend the effective coverage area of a base station in a sparsely populated (e.g. rural) region. In some cases, a repeater may transmit a slightly different signal from the one it is repeating (e.g. to distinguish the retransmitted signal from the original signal, or to identify the signal as being transmitted by a repeater). For example, a repeater of a DSSS CDMA signal may frequency-modulate the signal slightly before transmission and/or may apply a different spreading code. In another application of method M100, task T100 obtains the first time base from a signal received from a repeater.

In some applications of method M100, the received signal is a spread spectrum signal. Such a signal is modulated with a periodic spreading code (e.g. a pseudorandom noise (PRN) code) that has a chip rate much higher than the symbol rate of a data message carried by the signal. In a direct sequence spread spectrum (DSSS) system, for example, a data stream is multiplied (e.g. exclusive-OR'd) with one or more spreading codes before carrier modulation. The code phase of a spread spectrum signal is a quality that is recognized in the art and may be defined as a time difference between (A) the periodic spreading code as it appears in the signal under test and (B) a copy of the spreading code that is aligned to a predetermined time reference.

Figure 2:
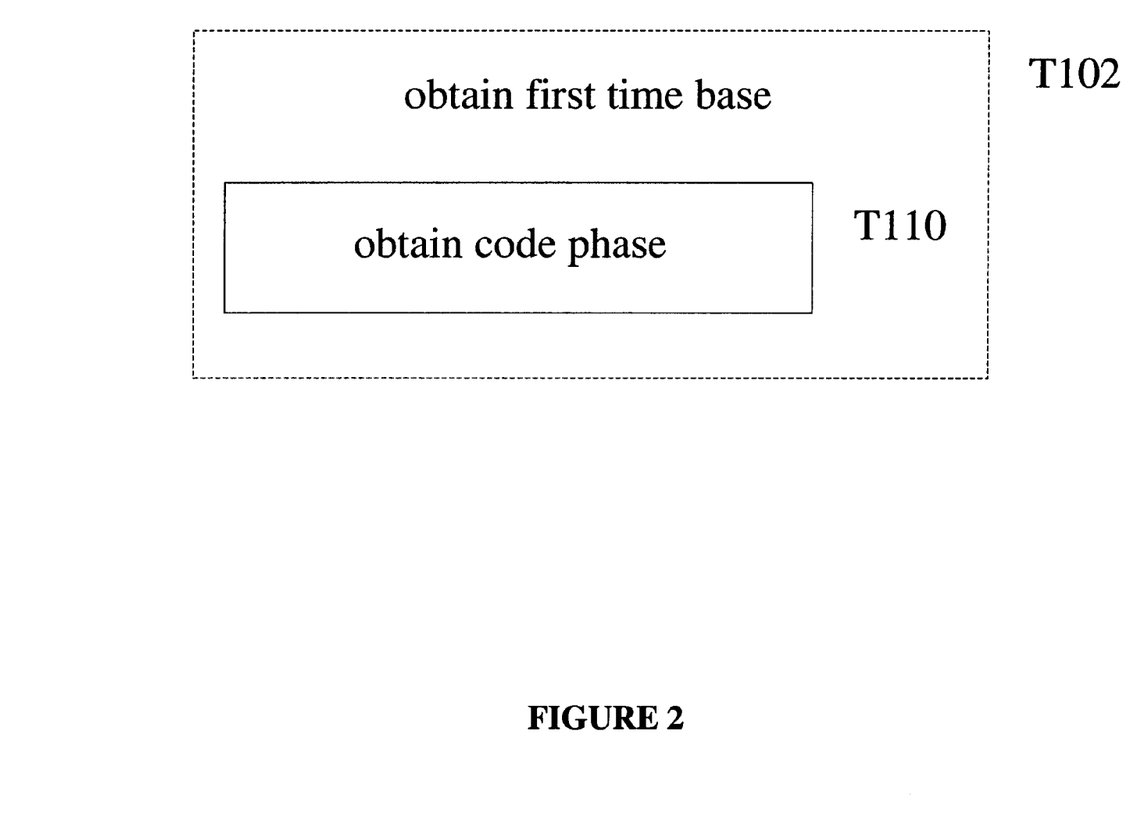
FIG. 2 shows an implementation T102 of task T100.

FIG. 2 shows an implementation T102 of task T100 that may be performed in a spread spectrum application. Task T110 obtains a code phase of the received signal. In a DSSS application, for example, task T110 may correlate one or more copies (e.g. having different delays) of the spreading code with the received signal (e.g. after carrier demodulation) to obtain the code phase. Alternatively, task T110 may obtain the code phase from a searcher as described in U.S. Pat. No. 5,764,687, 'MOBILE DEMODULATOR ARCHITECTURE FOR A SPREAD SPECTRUM COMMUNICATION SYSTEM' or U.S. Pat. No. 6,363,108, 'PROGRAMMABLE MATCHED FILTER SEARCHER' or other correlating or minimum mean-square estimation (MMSE) device.

It may be desirable to obtain a time base that is unambiguous over an interval greater than a period of the spreading code. In a further application of method M100, the received signal has a time information message. For example, such a message may identify a time (e.g. in hours, minutes, seconds, and/or portions of seconds) that has a predetermined relation to the time at which the signal was transmitted. Such a message may also identify a date having a predetermined relation to the time at which the signal was transmitted.

Figure 3:
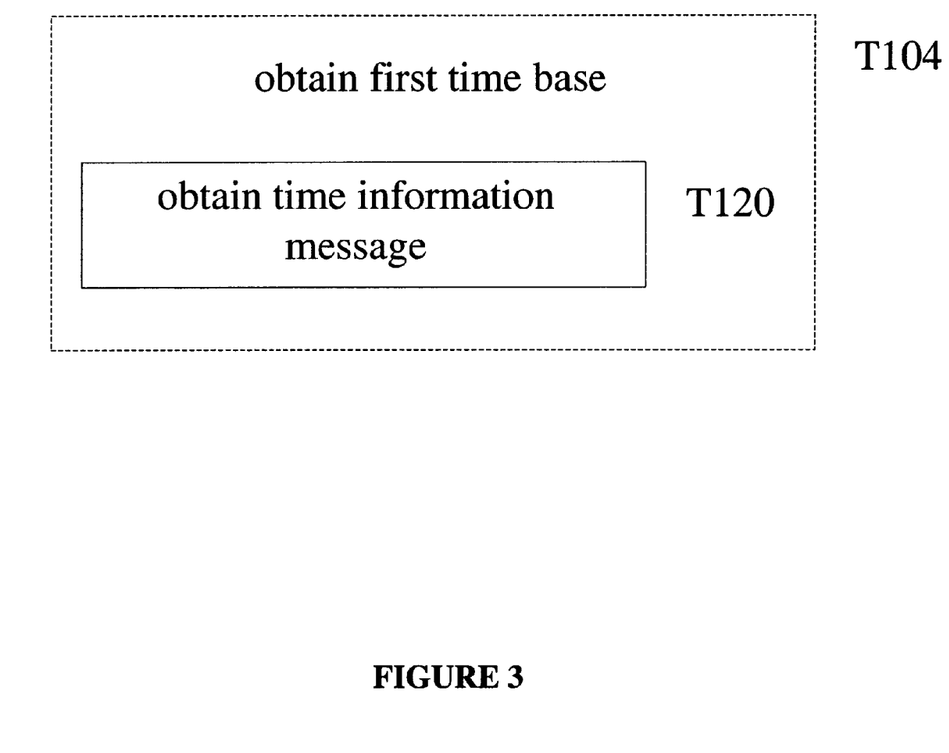
FIG. 3 shows an implementation T104 of task T100.

FIG. 3 shows an implementation T104 of task T100 that may be performed in such an application. Task T120 obtains a time information message from the received signal. For example, task T120 may include decoding the time information message from the demodulated received signal. In a DSSS application, task T120 may decode the time information message by despreading (i.e. applying one or more spreading codes, such as PRN codes) or uncovering (i.e. applying one or more covering codes, such as Walsh codes or other orthogonal or nearly orthogonal codes) to the received signal. Decoding the time information message may also include such data processing operations as deinterleaving a data stream, data decompression, and decoding one or more convolutional, turbo, and/or parity codes. In another implementation, task T120 may be performed after task T200.

The first time base may be represented by a value obtained from the received signal (e.g. the code phase). Alternatively, the first time base may be represented by a timing circuit, counter value, or other such device or quantity that is set according to a value obtained from the received signal. For example, task T100 may also include synchronizing a timing circuit such as an oscillator or clock, or adjusting a counter or a code generator, according to the obtained code phase and/or time information message.

Figure 4:
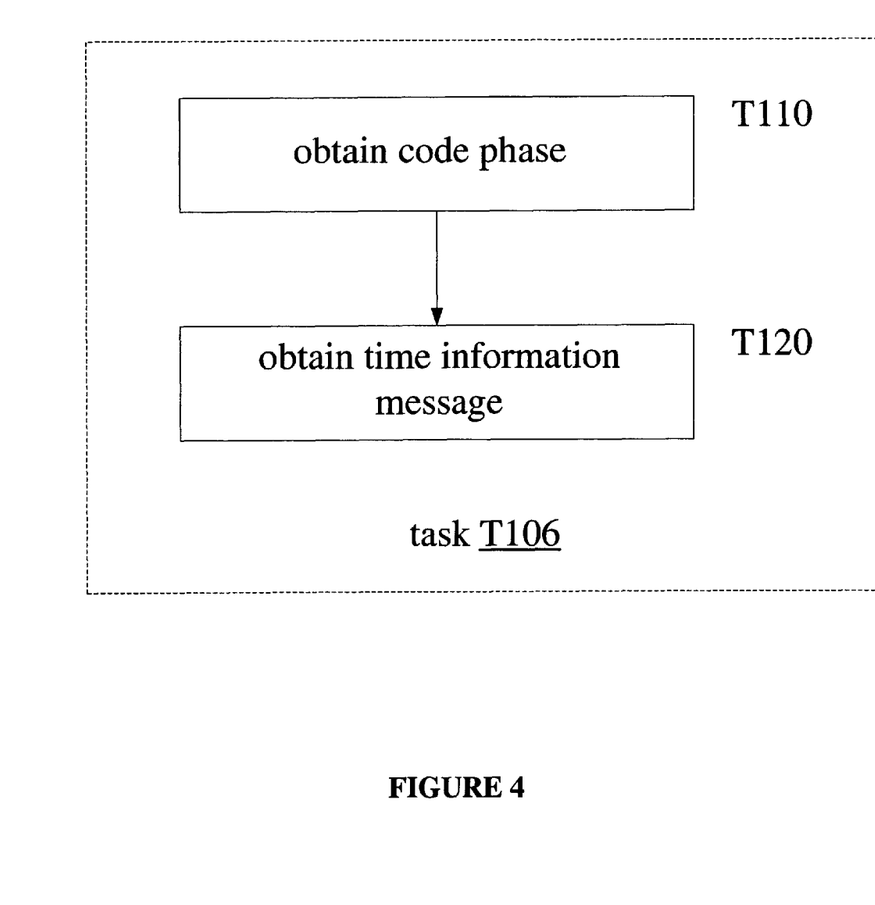
FIG. 4 shows an implementation T106 of task T100.

FIG. 4 shows an implementation T106 of task T100 that includes tasks T110 and T120. In one such application of method M100, task T110 obtains the code phase from one channel of the received signal, and task T120 decodes the time information message from a different channel of the received signal. In a case where the received signal is received from a base station of a CDMA network for cellular telephony, for example, the code phase may be acquired from a pilot channel, while the time information message may be acquired from a synchronization channel. In such a case, the two channels may be spread using different spreading codes (e.g. pseudorandom noise codes) and/or covered using different covering codes (e.g. Walsh codes).

The predetermined offset is based on a propagation delay of the received signal. The propagation delay may be obtained from direct measurement and/or may be calculated according to the length of the signal path between the ground transmitter and the point of reception (which calculation may account for multipath reflections). The predetermined offset may also be based on other factors such as calibration errors, which may include signal processing delays (analog and/or digital) at the point of reception, signal processing delays in the ground transmitter, and/or signal transmission delays (e.g. as caused by an antenna cable).

Task T200 obtains a second time base by applying the predetermined offset to the first time base. In an exemplary application of method M100, the predetermined offset is applied to the first time base by subtracting the offset from the time base (i.e. effectively turning the first time base backward in time). Task T200 may include synchronizing a timing circuit such as an oscillator or clock, or adjusting a counter or a code generator, according to the result of applying the predetermined offset to the first time base.

A base station of a CDMA network for cellular telephony that is compliant with at least one of the IS-95/2000 standards referenced above transmits a DSSS, PSK-modulated signal according to a time base that is aligned with the NAVSTAR GPS time base. Specifically, a spreading code sequence in a signal transmitted by such a base station is synchronized to the GPS time base as follows: every eighty milliseconds, the start of the CDMA spreading code (which has a period of 80/3 or 26.666 . . . milliseconds) coincides with a start of a GPS C/A sequence (which has a period of one millisecond) as transmitted by an SV.

In a particular application of method M100, the first time base is obtained from a signal received from a base station of a CDMA network for cellular telephony that is compliant with such a standard (or from a repeater of such a signal). Upon application of the predetermined offset (e.g. upon execution of task T200), a second time base is obtained that is aligned with the NAVSTAR GPS time base. In other words, propagation and possibly other delays in the received signal path are compensated such that the second time base (e.g. as maintained by a local clock or oscillator) is essentially the same as the GPS-aligned time base maintained by the base station (required by the standard to be within ten microseconds of the actual GPS time base, and typically within one microsecond of that time base).

Task T300 generates a timing signal based on the second time base. In one application, task T300 generates a signal that is spread by a PRN code (e.g. a GPS C/A sequence) whose start essentially coincides with the start of a C/A sequence as transmitted by a GPS SV. In other words, the code phase of such a timing signal is synchronized to the GPS time base.

In an exemplary implementation, task T300 constructs a GPS C/A code for the timing signal by exclusive-ORing the outputs of two linear feedback shift registers (LFSRs): one LFSR for an in-phase component of the timing signal and the other for a quadrature-phase component of the timing signal. The initial state for the in-phase LFSR is the same for all C/A codes, while the initial state for the quadrature-phase LFSR depends on the PRN number of the selected code. In such an implementation, task T300 may use PRN sequences 33 through 37 (which are not assigned to satellites), or any other of the 1023 possible GPS C/A codes may be used (lower-numbered PRN sequences have better cross-correlation properties), possibly excluding PRN sequences 1–32 (which are reserved for SVs).

In one implementation of task T300, the timing signal is transmitted without modulation by a data stream (e.g. the signal is modulated by a string of zeroes). Such an implementation may have the advantage of enabling a lower transmit power by supporting a longer period of coherent integration (e.g. for a greater effective signal-to-noise ratio) at the receiver of the timing signal. Advantages related to a lower transmit power may include extended battery life, reduced interference with an existing system, and greater deployment opportunities. In one example, such an implementation is applied to a situation where timing information that is unambiguous over an interval greater than a period of the code of the timing signal is already available or is otherwise unnecessary.

In another implementation of task T300, the code of the timing signal is modulated by a predetermined data pattern. In one such example, the code is modulated at the desired data rate (e.g. at the GPS data rate of 50 bits/second) by a stream of alternating zeroes and ones. Such an implementation may have the advantage of providing information regarding bit edge detection to the receiver of the timing signal. In another example, the code is modulated at the desired rate with a data pattern having a longer period. Such an example may be used to provide timing information that is unambiguous over a length of the period of the data pattern. Even in a situation where data representing other information is modulated onto the timing signal, a predetermined data pattern may be used to fill gaps where no such data is available or scheduled for transmission.

In some applications, it may be desirable for the timing signal to convey timing information that is unambiguous over an interval greater than a period of the spreading code. It may also be desirable for the timing signal to convey other types of information not necessarily related to timing. In such cases, in addition to the code phase, the timing signal may be modulated by data representing other information as described below.

In the NAVSTAR GPS, time is counted in 1.5-second epochs, and the current time base is communicated by each SV in a 29-bit binary number called a Z-count. The Z-count has two parts: the ten most significant bits indicate the sequential number of the current GPS week modulo 1024, and the least significant 19 bits indicate the number of epochs that have elapsed since the transition from the previous week (also called the time-of-week or TOW count, and corresponding to the start of the next subframe).

A NAVSTAR GPS navigation message includes a series of five subframes, each subframe having a length of 300 bits. In some respect, the subframes are similar. For example, each subframe begins with a 30-bit telemetry (TLM) word whose content is usually constant, followed by a 30-bit handover word (HOW) that begins with the 17 most significant bits of the TOW count. In other respects, the subframes differ. Subframe 1 includes the ten most significant bits of the Z-count (i.e. the GPS week number modulo 1024) and satellite clock correction parameters. Subframes 2 and 3 include parameters that indicate the SV's location, velocity, and direction (also called 'ephemeris data'). Subframes 4 and 5 include almanac data.

In a further implementation of method M100, the timing signal is modulated by data representing information that mimics some portion of the GPS navigation message. For example, the timing signal may be modulated by a time information message at the GPS data rate of 50 Hz that has an appropriate copy (e.g. with respect to format and location within the message) of at least a portion of the GPS Z-count (e.g. the HOW).

In another example, the timing signal is modulated by data that identifies the latitude and longitude of the point of transmission (e.g. in an ephemeris data portion corresponding an appropriate portion of GPS subframes 2 and/or 3). Such positional information may be measured and recorded when implementation of the method begins and may be updated in a case where the point of transmission is moved. In one such implementation, for example, the timing signal is modulated by ephemeris data that describes the decaying Keplerian orbit of a satellite just prior to impact with the earth (e.g. at the point of reception).

In a further example, the timing signal is modulated by information that is usually constant in the GPS navigation message (e.g. the TLM word). Such information may facilitate reception of the transmitted timing signal (e.g. by aiding in signal integration).

In implementations for other GPS applications, the timing signal may be modulated by data that does not correspond to data in the GPS navigation message. In an application to a network for wireless communications, for example, additional information may be received over a paging channel. In a CDMA network for cellular telephony, such information may include data identifying the base station (e.g. a base station identification number or 'BSID'), data relating to other network parameters (e.g. information identifying a CDMA frequency band and/or a frequency slot within such a band, a network identification number or 'NID', a system identification number or 'SID'), and/or data transmitted in the form of a broadcast message. Information received in this or another manner may be passed along to appear in the timing signal.

Other information included in the data modulating the timing signal may identify or otherwise relate to a device that performs an implementation of method M100 (or an implementation of another method according to an embodiment of the invention, or a portion of such a method). For example, values relating to location, ambient or operating temperature, power reserve level, and/or estimated timing error may be communicated via the timing signal. Task T300 may also include data processing operations such as interleaving, coding (e.g. convolutional, turbo, and/or parity coding), and puncturing.

Even in a GPS application, the data rate of the timing signal need not be limited to the 50 bits/second of the navigation message. For example, the data rate of a signal that is spread using a GPS C/A code may reach as high as 1000 bits/second. In one application, at least a portion of the timing signal conforms to the higher-data-rate format of a GPS-based WAAS (Wide Area Augmentation System), which transmits at a data rate of 500 bits/second.

Figure 5:
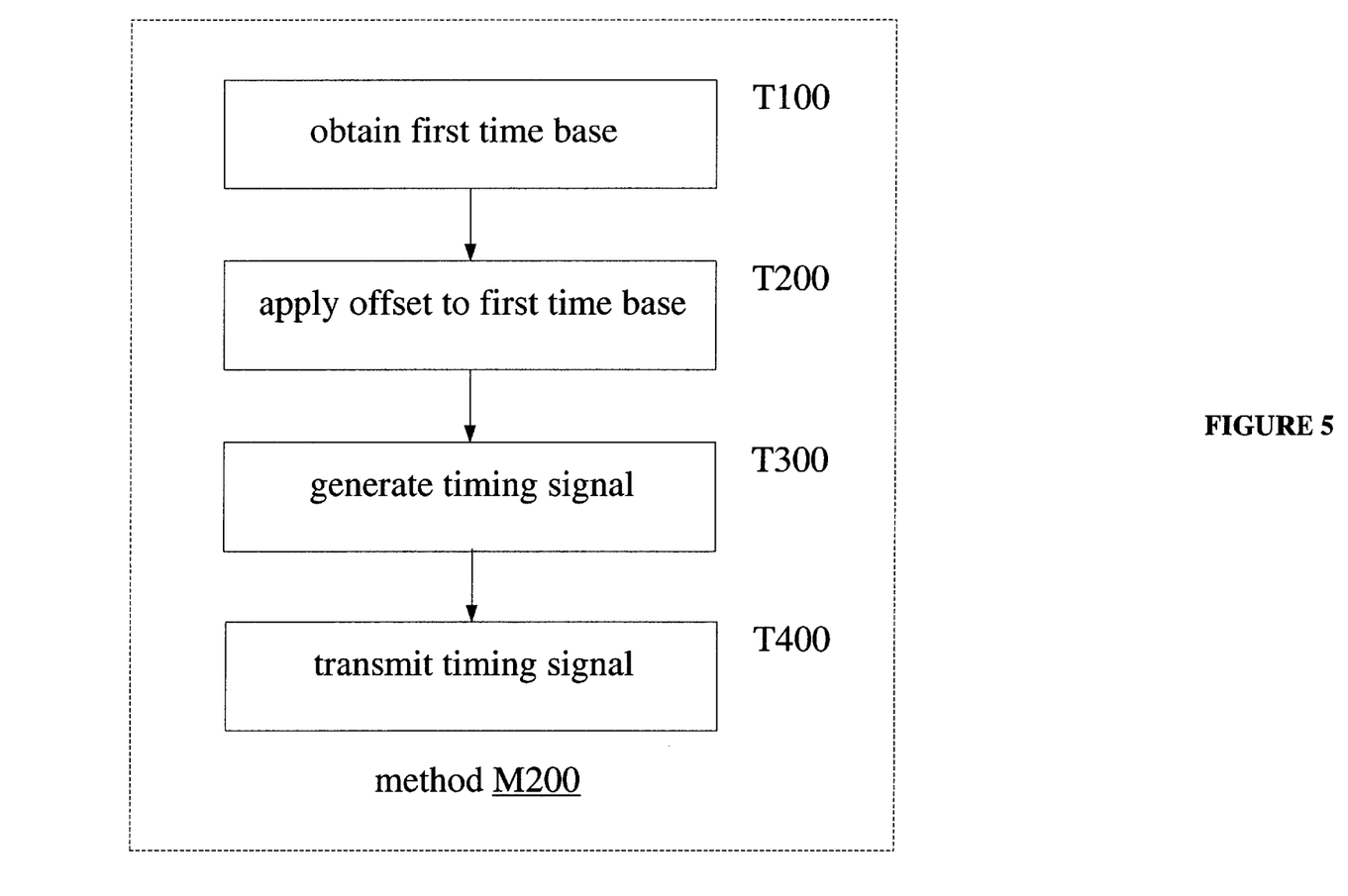
FIG. 5 shows a flowchart of an implementation M200 of method M100.

FIG. 5 shows a flowchart for a method M200 according to an embodiment of the invention. Task T400 transmits the timing signal. For a NAVSTAR GPS application, task T400 may transmit the timing signal at the GPS L1 carrier frequency using BPSK modulation (e.g. with a time-limited square pulse shape). In other applications, the timing signal may be modulated onto one or more carrier signals according to an amplitude modulation (AM) scheme such as OOK (on-off keying); a frequency shift keying (FSK) scheme; a phase shift keying (PSK) scheme such as QPSK (quadrature PSK), 8-PSK, or OQPSK (offset QPSK); a minimum shift keying (MSK) scheme such as GMSK (Gaussian MSK); or a mixed scheme such as QAM (quadrature amplitude modulation). Task T400 may also include signal processing operations such as filtering (e.g. pulse-shaping), amplification, and impedance matching.

In a case where the timing signal (or an image or harmonic thereof) is transmitted at or near a frequency that is used by an existing system, a near-far problem or other interference problem may be encountered. For example, a receiver of NAVSTAR GPS signals is typically designed to receive SV signals at a power level of −160 dBw. The worst-case cross-correlation between two GPS C/A codes is estimated to be −21.6 dB. Therefore, cross-correlations between signals from GPS SVs and a timing signal spread with a GPS C/A code and BPSK-modulated onto an L1 carrier may be expected to begin at a received power level of only −138.4 dBw. For example, a signal spread with a GPS C/A code of PRN greater than 32 may interfere in such manner with the operation of a GPS receiver even if the particular receiver does not recognize C/A codes of PRN greater than 32. In one implementation, task T400 transmits the timing signal at a power level that is selected according to factors such as the desired 'near limit' (i.e. the radius within which interference with an existing system may occur) and 'far limit' (i.e. the radius beyond which the transmitted timing signal is too weak for acceptable reception).

In other implementations, task T400 transmits the timing signal over a carrier whose center frequency is shifted with respect to a frequency of the existing system. In one such implementation, the center frequency of the transmitted timing signal is placed at a spectral null of the signal of the existing system. For example, the timing signal may be transmitted at a frequency that is offset from the GPS L1 carrier frequency by 1.023 MHz. In some applications of such an implementation, it may be desirable to modify a receiver's signal processing path to ensure that the transmitted timing signal falls within the receiver's passband.

In another implementation, task T300 uses a different C/A code to spread the timing signal. For example, a longer code at the same chip rate may be used, or a code at a different chip rate (e.g. the 10-MHz chip rate used by the NAVSTAR GPS P code) may be used.

In a further implementation, task T400 varies the power level of the transmitted timing signal over time. For example, the transmitted timing signal may be pulsed at a duty cycle of approximately 10%, with pulse durations of approximately 100 microseconds.

In a method according to another embodiment of the invention, the predetermined offset as described above may already be incorporated into the received signal. For example, a ground transmitter (e.g. a base station or repeater) transmitting a spread spectrum signal may advance the code phase of the signal according to the predetermined offset. In such a case, the timing signal may be based on the time base of the received signal.

Figure 6:
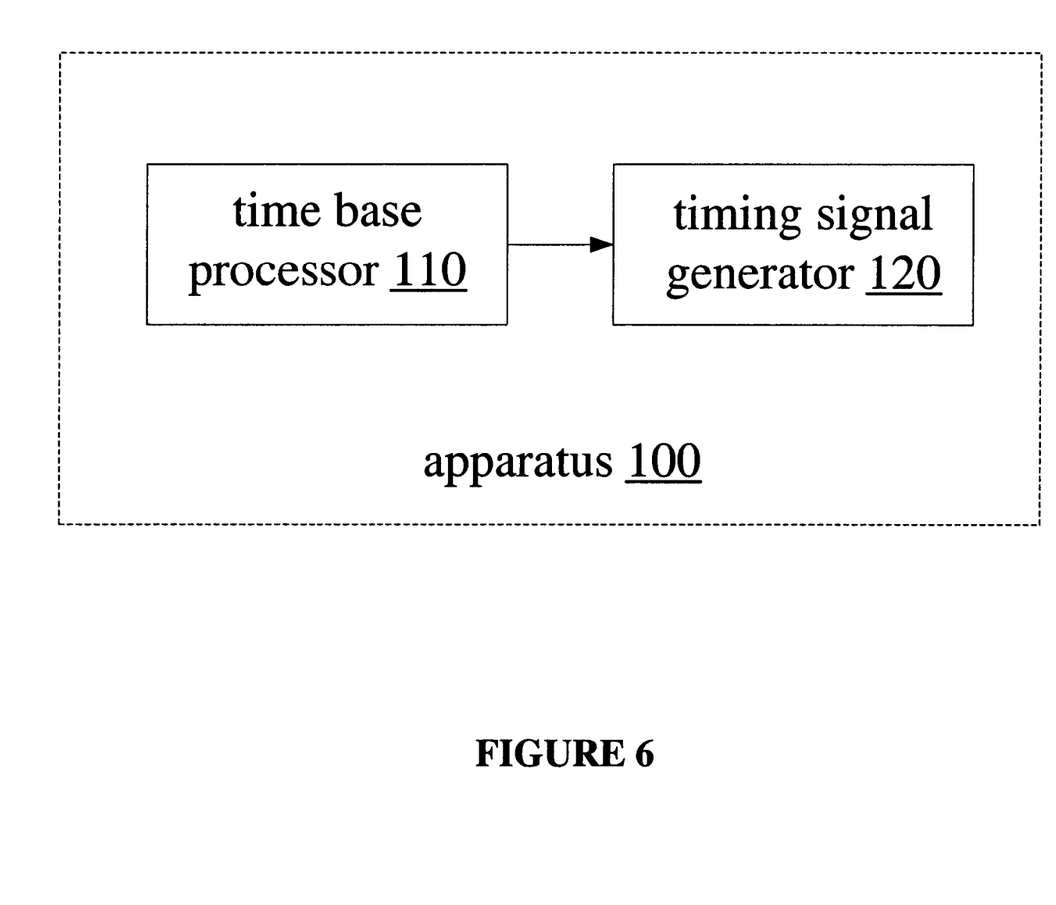
FIG. 6 is a block diagram of an apparatus 100 according to an embodiment of the invention.

FIG. 6 shows a block diagram of an apparatus 100 according to an embodiment of the invention. Time base processor 110 applies a predetermined offset to a first time base to obtain a second time base. Timing signal generator 120 generates a timing signal whose code phase is based on the second time base.

Time base processor 110 and timing signal generator 120 may each include one or more processors and/or arrays of logic elements. Such arrays may be implemented as general-purpose devices (such as microprocessors or other digital signal processors), embodied within one or more application-specific integrated circuits (ASICs), and/or programmed into one or more configurable devices such as field-programmable gate arrays (FPGAs). In some applications, the same array or arrays may serve as time base processor 110 (or a portion thereof) at one time and as timing signal generator 120 (or a portion thereof) at a different time.

It may also be possible for such an array or arrays to perform in parallel tasks of both time base processor 110 and timing signal generator 120. Alternatively or additionally, one or both of processor 110 and generator 120 may include a set of instructions executable on one or more such arrays of logic elements.

Figure 7:
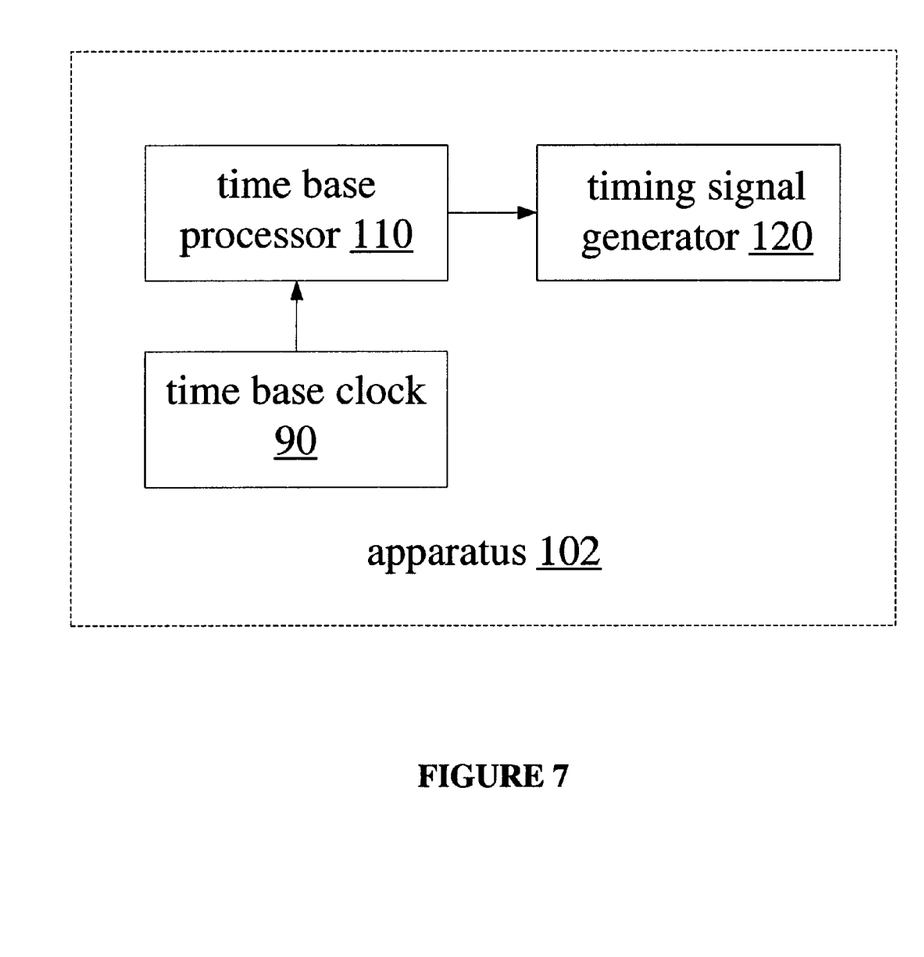
FIG. 7 is a block diagram of an implementation 102 of apparatus 100.

FIG. 7 shows a block diagram of an implementation 102 of apparatus 100. Time base clock 90 may include a timing circuit such as an oscillator and may also include a counter (in hardware, firmware, and/or software) driven by the timing circuit. In one arrangement of apparatus 102, time base clock 90 provides time base processor 110 with the first time base. In another arrangement of apparatus 102, time base processor 110 applies the predetermined offset to the first time base as obtained from the received signal and forwards this value to time base clock 90, which clock then maintains the second time base.

Figure 8:
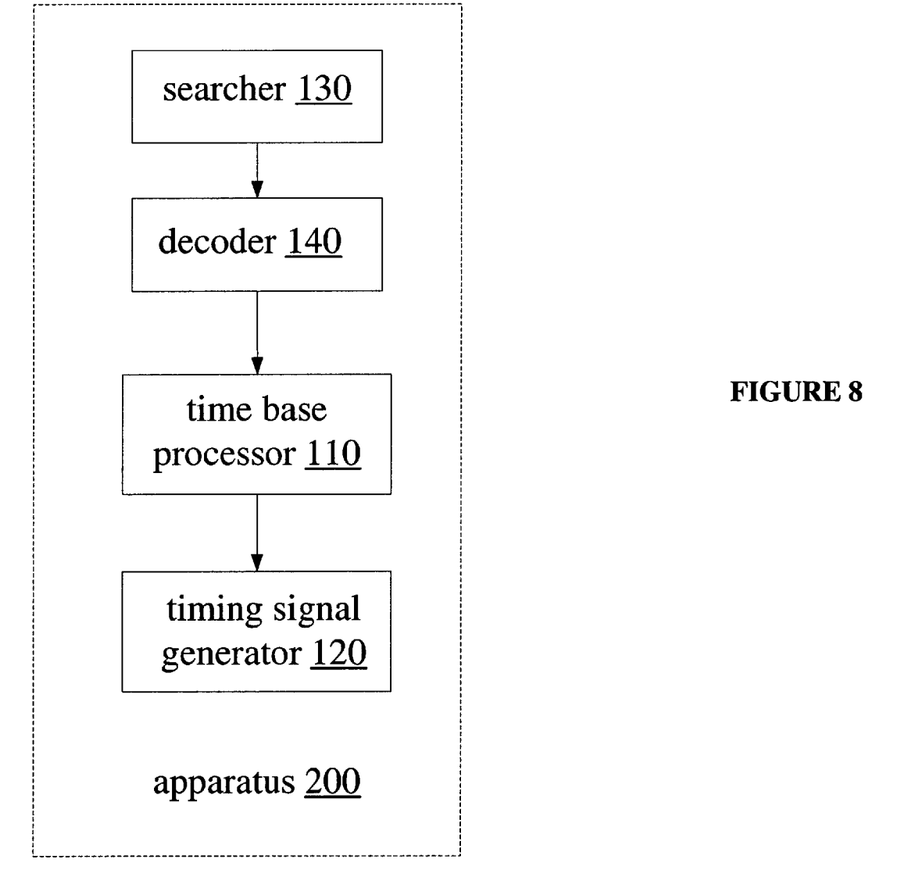
FIG. 8 is a block diagram of an implementation 200 of apparatus 100.

FIG. 8 shows a block diagram of an implementation 200 of apparatus 100. Searcher 130 obtains a code phase of the received signal and may include any suitable correlating or MMSE device. Decoder 140 obtains a time information message from the received signal and may perform operations such as despreading, decompression, deinterleaving, and decoding of convolutional, turbo, and/or parity codes. An implementation of apparatus 100 may also include fingers (e.g. within decoder 140) that are assigned (e.g. by searcher 130) to despread individual multipath instances of the received signal.

Figure 9:
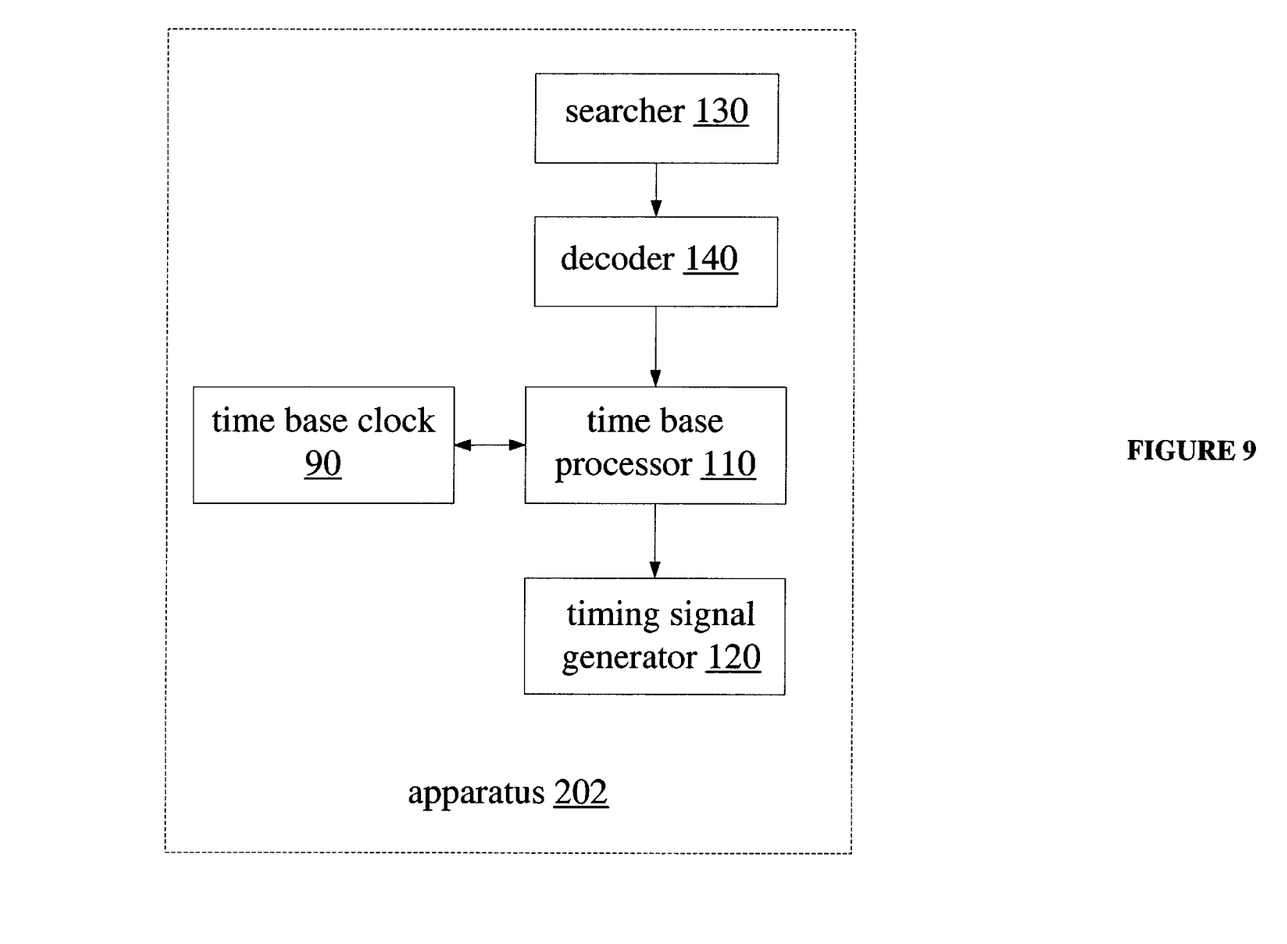
FIG. 9 is a block diagram of an implementation 202 of apparatus 200.

FIG. 9 shows a block diagram of an implementation 202 of apparatus 200. Time base processor 110 sets time base clock 90 according to the first time base, and thereafter time base clock 90 provides time base processor 110 with the first time base. In another arrangement of apparatus 202, time base processor 110 applies the predetermined offset to the first time base as obtained from the received signal and forwards this value to time base clock 90, which clock then maintains the second time base.

Figure 10:
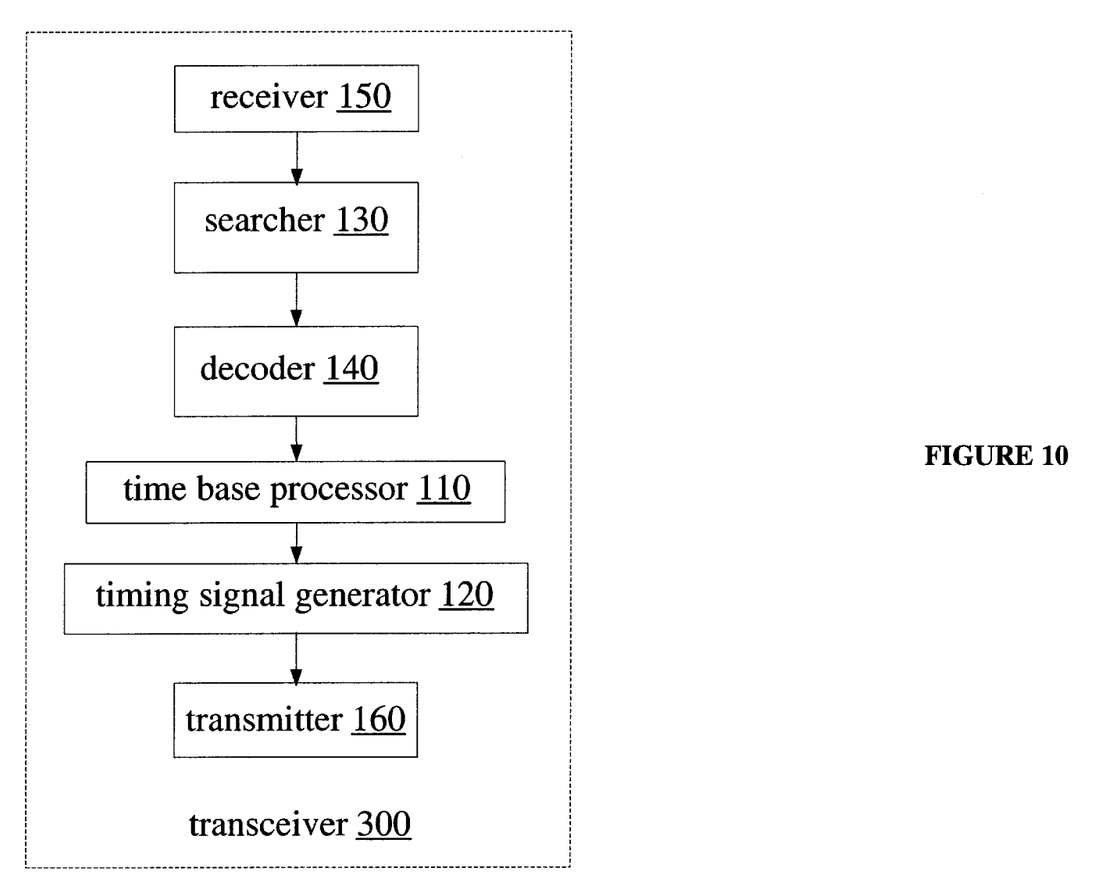
FIG. 10 is a block diagram of an implementation 300 of apparatus 100.
Figure 11:
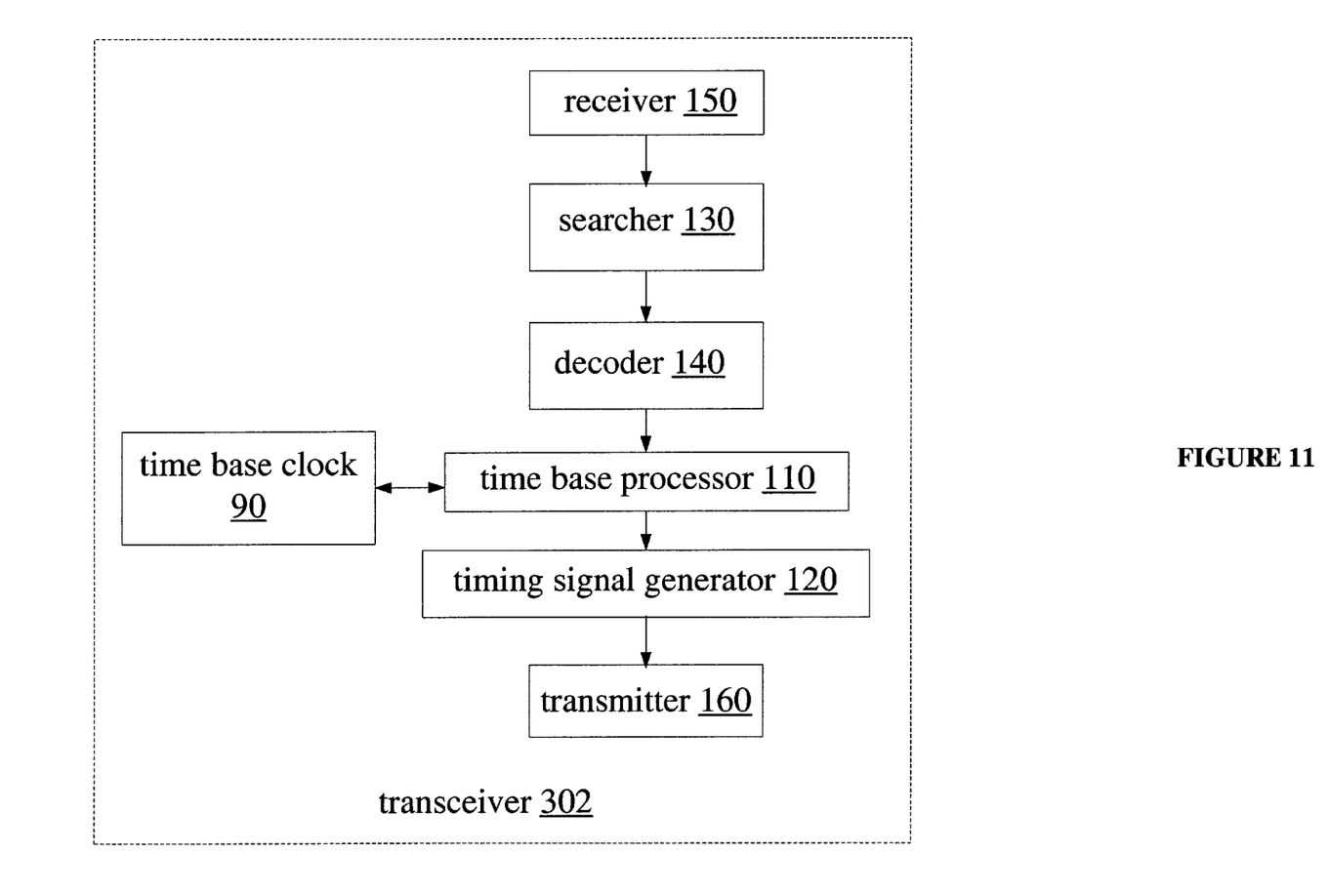
FIG. 11 is a block diagram of an implementation 302 of apparatus 300.

FIG. 10 shows a transceiver 300 according to an embodiment of the invention. Receiver 150 receives the received signal, and transmitter 160 transmits the timing signal. Receiver 150 may filter and/or amplify the received signal and downconvert the signal to baseband. Transmitter 160 may upconvert the timing signal to RF and amplify and/or filter the signal. FIG. 11 shows a block diagram of an implementation 302 of apparatus 300 that includes time base clock 90.

The received and transmitted signals may differ in kind, such as in terms of frequency, amplitude, and/or bandwidth. The received and transmitted signals may also differ in terms of the modulation schemes according to which each signal is produced. For example, the signals may be modulated according to an amplitude modulation (AM) scheme such as OOK (on-off keying); a frequency shift keying (FSK) scheme; a phase shift keying (PSK) scheme such as BPSK (binary PSK), QPSK (quadrature PSK), 8-PSK, or OQPSK (offset quadrature phase shift keying); a minimum shift keying (MSK) scheme such as GMSK (Gaussian minimum shift keying); or a mixed scheme such as QAM (quadrature amplitude modulation). Transceiver 300 may but need not be constructed or configured to receive and transmit signals of like kind.

In some applications, the various elements of transceiver 300 are implemented as multi-functional modules and/or as interconnected modules. Further, such modules may be located in multiple discrete devices in some embodiments.

In an exemplary application, transceiver 300 receives signals from a base station of a CDMA network for cellular telephony (e.g. over a portion of an 800 MHz, 1.7 GHz, or 1.9 GHz band) and transmits a timing signal spread with a GPS C/A code and BPSK-modulated on an L1 carrier. In a particular embodiment, decoder 140 outputs a strobe signal every 80 milliseconds that is synchronized with the start of both the CDMA PRN code of the received signal and the GPS C/A code to which its timing is related. In other arrangements of an apparatus 100 as shown in FIGS. 8–11, decoder 140 may be downstream of time base processor 110, e.g. such that the predetermined offset has been applied to the signal inputted to decoder 140.

In some applications, an appropriate implementation of transceiver 300 may be used to augment a position location solution in environments where GPS signal detection is difficult or impossible: for example, an urban canyon, indoors, or underground. In such cases, a transceiver 300 may be placed in a building, a subway or other tunnel, a below-ground business area or other underground structure or area such as a cavern. In some such applications, an implementation of transceiver 300 that does not require signal visibility to a GPS satellite may be freely moved and positioned within its environment (possibly subject to recalibration of the predetermined offset).

An implementation of transceiver 300 may include one or more nonvolatile parameters. For example, timing signal generator 120 may reference one or more such parameters to configure one or more codes used to spread and/or cover the timing signal (e.g. a GPS PRN number). At least some of these parameters may be programmable, such as via a keypad or external data connection.

Implementations of transceiver 300 may be constructed that share much hardware with a cellular telephone but need not include a display or input device (e.g. keypad), have a weaker power amplifier, and/or are powered at least partially by a battery and/or by ambient (e.g. solar) energy or some other external power source.

Figure 12:
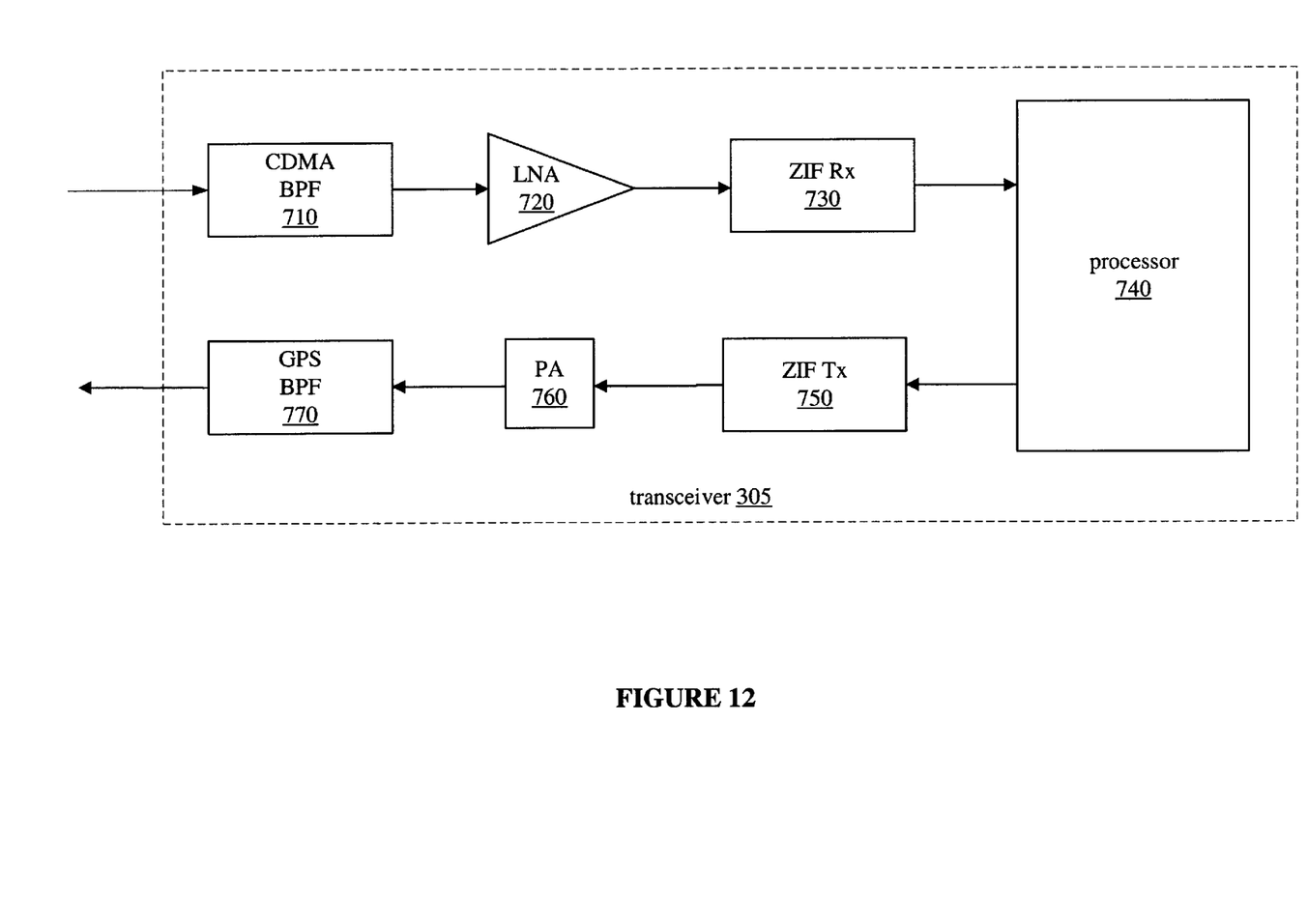
FIG. 12 is a block diagram of an implementation 305 of apparatus 300.

FIG. 12 is a block diagram of a particular implementation 305 of transceiver 300. Bandpass filter (BPF) 710 passes signals in a selected CDMA cellular telephony band. Low noise amplifier (LNA) 720 amplifies the received signal to a desired level. Zero intermediate frequency (ZIF) receive downconverter 730 downconverts the received signal to baseband. In an exemplary implementation, ZIF receive downconverter 730 includes the RFR6000™ RF-to-receive-baseband chip (QUALCOMM Incorporated, San Diego, Calif.). In other embodiments, the received signal may be downconverted to an intermediate frequency and then to baseband.

Processor 740 obtains the first time base from the baseband signal outputted by downconverter 730. Processor 740 then applies a predetermined offset and generates a timing signal as described herein (e.g. a timing signal modulated by data representing information that is based on at least a portion of the GPS navigation message format). For example, processor 740 may include an MSM6000™ or MSM6050™ baseband processor (QUALCOMM Inc.) configured to provide an 80-millisecond time strobe (synchronized to the start of both the CDMA PRN code of the received signal and the GPS C/A code to which its timing is related) to one or more additional processors.

ZIF transmit upconverter 750 upconverts the timing signal from baseband to RF for transmission. ZIF transmit upconverter 750 may include an RF16100™ transmit-baseband-to-RF converter (QUALCOMM Inc.) or other device capable of transmitting at the desired frequency. In other embodiments, the timing signal may be upconverted to an intermediate frequency and then to RF. PA 760 amplifies the RF signal outputted by ZIF transmit upconverter 750 to a desired level for transmission, and GPS BPF 770 filters the amplified signal as desired before transmission.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit or as a circuit configuration fabricated into an application-specific integrated circuit The invention may also be implemented in part or in whole as a firmware program loaded into non-volatile storage or a software program loaded from or into a data storage medium as machine-readable code, such code being instructions executable by an array of logic elements as described above. In one example, the data storage medium is a semiconductor chip (or portion thereof) such as an ASIC or random-access memory module (e.g. CMOS, flash, or ferroelectric). In another example, the storage medium is a magnetic, optical, magneto-optional, or phase-change medium in disk or tape form (e.g. a floppy or hard disk or a compact disk) or removable module (e.g. a card in PCMCIA, CompactFlash, SmartMedia, or MemoryStick format).

Thus, the present invention is not intended to be limited to the embodiments shown above but rather is to be accorded the widest scope consistent with the principles and novel features disclosed in any fashion herein.

What is claimed is:

1. An apparatus for wireless communications, said apparatus comprising:

a receiver configured and arranged to receive a signal from a ground transmitter;

a decoder configured and arranged to decode a time information message from the received signal and arranged to output a strobe signal indicating a coincidence between code phases of a spreading code of the signal being decoded and a corresponding GPS C/A code;

a time base processor configured and arranged to apply a predetermined offset to a time base of the received sign to obtain a second time base; and a timing signal generator configured and arranged to generate a timing signal, wherein a code phase of the timing signal is based on the second time base.

2. The apparatus for wireless communications according to claim 1, said apparatus further comprising a searcher configured and arranged to obtain a code phase of the received signal.

3. The apparatus for wireless communications according to claim 1, wherein the second time base is aligned with a time base of a positioning satellite system.

4. The apparatus for wireless communications according to claim 3, wherein said timing signal generator is further configured and arranged to spread the timing signal with a spreading code of positioning satellite system.

5. The apparatus for wireless communications according to claim 1, wherein said time base processor is further configured and arranged to perform at least one among the acts of (A) synchronizing an oscillator according to the time base of the received signal and (B) adjusting a code generator according to the time base of the received signal.

6. The apparatus for wireless communications according to claim 1, wherein said time base processor is further configured and arranged to perform at least one among the acts of (A) synchronizing an oscillator according to the second time base and (B) adjusting a code generator according to the second time base.

* * * * *